(12) United States Patent
Dean

(10) Patent No.: US 6,371,569 B1
(45) Date of Patent: Apr. 16, 2002

(54) DUST COVER FOR PLACEMENT BETWEEN A WHEEL AND A BRAKE ASSEMBLY

(76) Inventor: Edward R. Dean, 913 Wisconsin St. SW., Wyoming, MI (US) 49509

(*) Notice: Subject to any disclaimer, the term of this patent is extended or adjusted under 35 U.S.C. 154(b) by 0 days.

(21) Appl. No.: 09/641,838

(22) Filed: Aug. 18, 2000

(51) Int. Cl.[7] .......................... B60B 7/00; B60B 19/00; B60B 37/00; B60B 7/14; F16D 65/10
(52) U.S. Cl. .............. 301/37.101; 301/6.1; 301/37.371; 188/218 A
(58) Field of Search ..................... 188/218 A, 218 R, 188/218; 301/37.1, 37.37, 37.42, 6.1, 6.8, 6.91, 37.101, 37.371

(56) References Cited

U.S. PATENT DOCUMENTS

| | | |
|---|---|---|
| D173,802 S | 1/1955 | Gaylord et al. |
| 4,441,762 A | 4/1984 | Segal |
| 4,484,667 A | 11/1984 | Bottieri, Jr. |
| 5,659,989 A | 8/1997 | Hsiao et al. |
| 5,722,734 A | 3/1998 | Bennick |
| 5,772,286 A | 6/1998 | Jordan |
| 6,047,796 A * | 4/2000 | Fitzgerald ............... 188/218 A |
| 6,089,671 A * | 7/2000 | Iacovelli et al. ........... 301/37.1 |
| 6,155,650 A * | 12/2000 | Barger ......................... 301/6.3 |

* cited by examiner

Primary Examiner—S. Joseph Morano
Assistant Examiner—Jason R. Bellinger

(57) ABSTRACT

A dust cover for placement between a wheel and brake assembly for preventing dust from the brakes to fall upon the wheel rim. The dust cover for placement between a wheel and brake assembly includes a plate having a front side, a back side and a peripheral edge. The front and back sides generally have a circular shape. The plate has an aperture therethrough. The aperture is generally positioned in a central portion of the plate and has a size adapted for receiving the hub of a vehicle. The plate has a plurality of openings therein. Each of the openings is positioned to receive one of the lug studs of the hub. The plate has a plurality of elongate slots therein. Each of the slots radially extends toward the peripheral edge. The plate comprises a substantially rigid material.

11 Claims, 3 Drawing Sheets

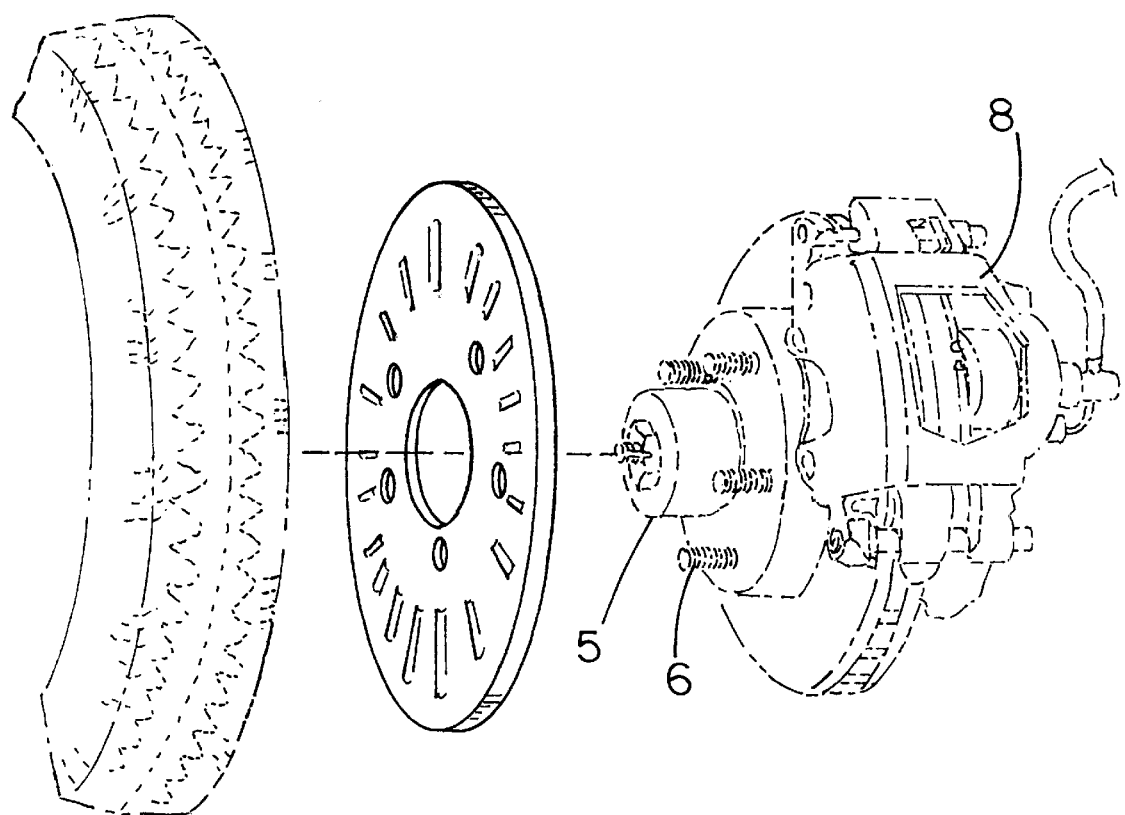
FIG. 5
FIG. 6
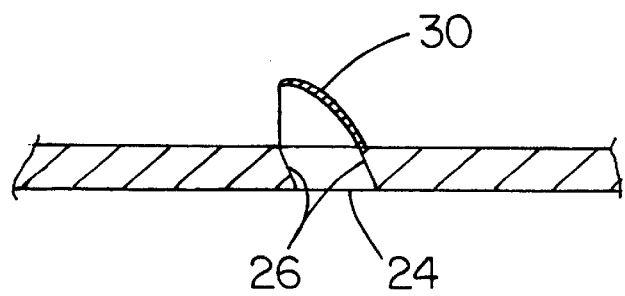

DUST COVER FOR PLACEMENT BETWEEN A WHEEL AND A BRAKE ASSEMBLY

BACKGROUND OF THE INVENTION

1. Field of the Invention

The present invention relates to vehicle brake assembly dust covers and more particularly pertains to a new dust cover for placement between a wheel and brake assembly for preventing dust from the brakes to fall upon the wheel rim.

2. Description of the Prior Art

The use of vehicle brake assembly dust covers is known in the prior art. More specifically, vehicle brake assembly dust covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,484,667; U.S. Pat. No. 5,722,734; U.S. Pat. No. 5,772,286; U.S. Pat. No. 4,441,762; U.S. Pat. No. 5,659,989; and U.S. Des. Pat. No. 173,802.

While these devices fulfill their respective, particular objectives and requirements, the aforementioned patents do not disclose a new dust cover for placement between a wheel and brake assembly. The inventive device includes a plate having a front side, a back side and a peripheral edge. The front and back sides generally have a circular shape. The plate has an aperture therethrough. The aperture is generally positioned in a central portion of the plate and has a size adapted for receiving the hub of a vehicle. The plate has a plurality of openings therein. Each of the openings is positioned to receive one of the lug studs of the hub. The plate has a plurality of elongate slots therein. Each of the slots radially extends toward the peripheral edge. The plate comprises a substantially rigid material.

In these respects, the dust cover for placement between a wheel and brake assembly according to the present invention substantially departs from the conventional concepts and designs of the prior art, and in so doing provides an apparatus primarily developed for the purpose of preventing dust from the brakes to fall upon the wheel rim.

SUMMARY OF THE INVENTION

In view of the foregoing disadvantages inherent in the known types of vehicle brake assembly dust covers now present in the prior art, the present invention provides a new dust cover for placement between a wheel and brake assembly construction wherein the same can be utilized for preventing dust from the brakes to fall upon the wheel rim.

The general purpose of the present invention, which will be described subsequently in greater detail, is to provide a new dust cover for placement between a wheel and brake assembly apparatus and method which has many of the advantages of the vehicle brake assembly dust covers mentioned heretofore and many novel features that result in a new dust cover for placement between a wheel and brake assembly which is not anticipated, rendered obvious, suggested, or even implied by any of the prior art vehicle brake assembly dust covers, either alone or in any combination thereof.

To attain this, the present invention generally comprises a plate having a front side, a back side and a peripheral edge. The front and back sides generally have a circular shape. The plate has an aperture therethrough. The aperture is generally positioned in a central portion of the plate and has a size adapted for receiving the hub of a vehicle. The plate has a plurality of openings therein. Each of the openings is positioned to receive one of the lug studs of the hub. The plate has a plurality of elongate slots therein. Each of the slots radially extends toward the peripheral edge. The plate comprises a substantially rigid material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dust cover for placement between a wheel and brake assembly apparatus and method which has many of the advantages of the vehicle brake assembly dust covers mentioned heretofore and many novel features that result in a new dust cover for placement between a wheel and brake assembly which is not anticipated, rendered obvious, suggested, or even implied by any of the prior art vehicle brake assembly dust covers, either alone or in any combination thereof.

It is another object of the present invention to provide a new dust cover for placement between a wheel and brake assembly which may be easily and efficiently manufactured and marketed.

It is a further object of the present invention to provide a new dust cover for placement between a wheel and brake assembly which is of a durable and reliable construction.

An even further object of the present invention is to provide a new dust cover for placement between a wheel and brake assembly which is susceptible of a low cost of manufacture with regard to both materials and labor, and which accordingly is then susceptible of low prices of sale to the consuming public, thereby making such dust cover for placement between a wheel and brake assembly economically available to the buying public.

Still yet another object of the present invention is to provide a new dust cover for placement between a wheel and brake assembly which provides in the apparatuses and methods of the prior art some of the advantages thereof, while simultaneously overcoming some of the disadvantages normally associated therewith.

Still another object of the present invention is to provide a new dust cover for placement between a wheel and brake assembly for preventing dust from the brakes to fall upon the wheel rim.

Yet another object of the present invention is to provide a new dust cover for placement between a wheel and brake assembly which includes a plate having a front side, a back side and a peripheral edge. The front and back sides generally have a circular shape. The plate has an aperture therethrough. The aperture is generally positioned in a central portion of the plate and has a size adapted for receiving the hub of a vehicle. The plate has a plurality of openings therein. Each of the openings is positioned to receive one of the lug studs of the hub. The plate has a plurality of elongate slots therein. Each of the slots radially extends toward the peripheral edge. The plate comprises a substantially rigid material.

Still yet another object of the present invention is to provide a new dust cover for placement between a wheel and brake assembly that is retrofittable on existing vehicles.

Even still another object of the present invention is to provide a new dust cover for placement between a wheel and brake assembly that blows air across the brakes to throw dust from the brakes away from the wheel rim and to additionally cool the brakes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of the present invention.

FIG. 6 is a schematic side cross-sectional view taken along line 6—6 of the present invention.

DESCRIPTION OF THE PREFERRED EMBODIMENT

Figure 1:
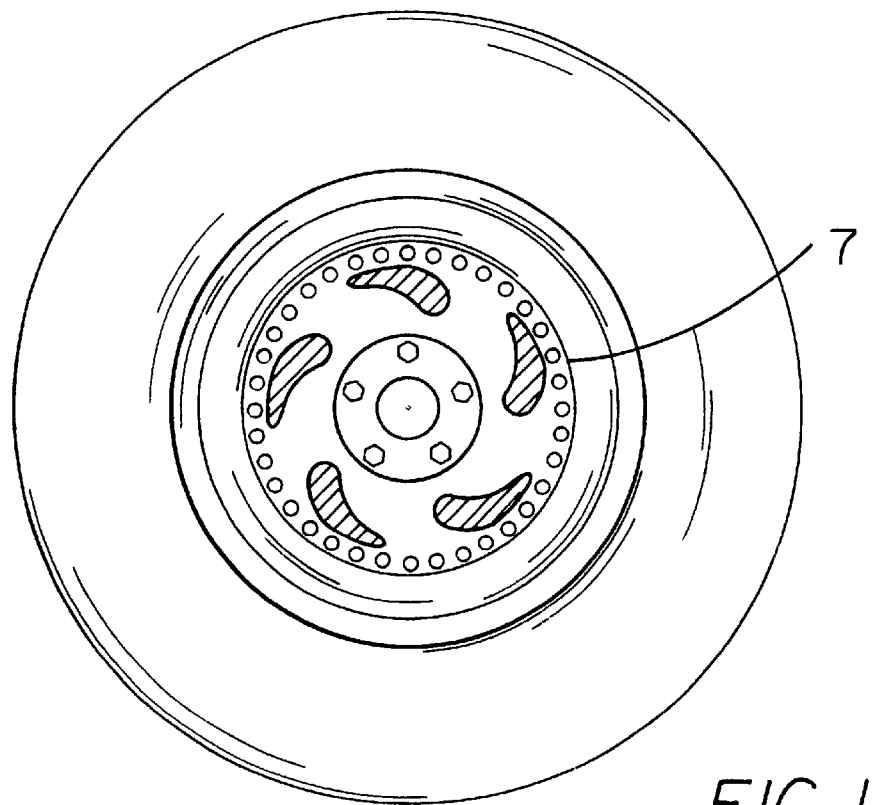
FIG. 1 is a schematic front view of a new dust cover for placement between a wheel and brake assembly according to the present invention.
Figure 2:
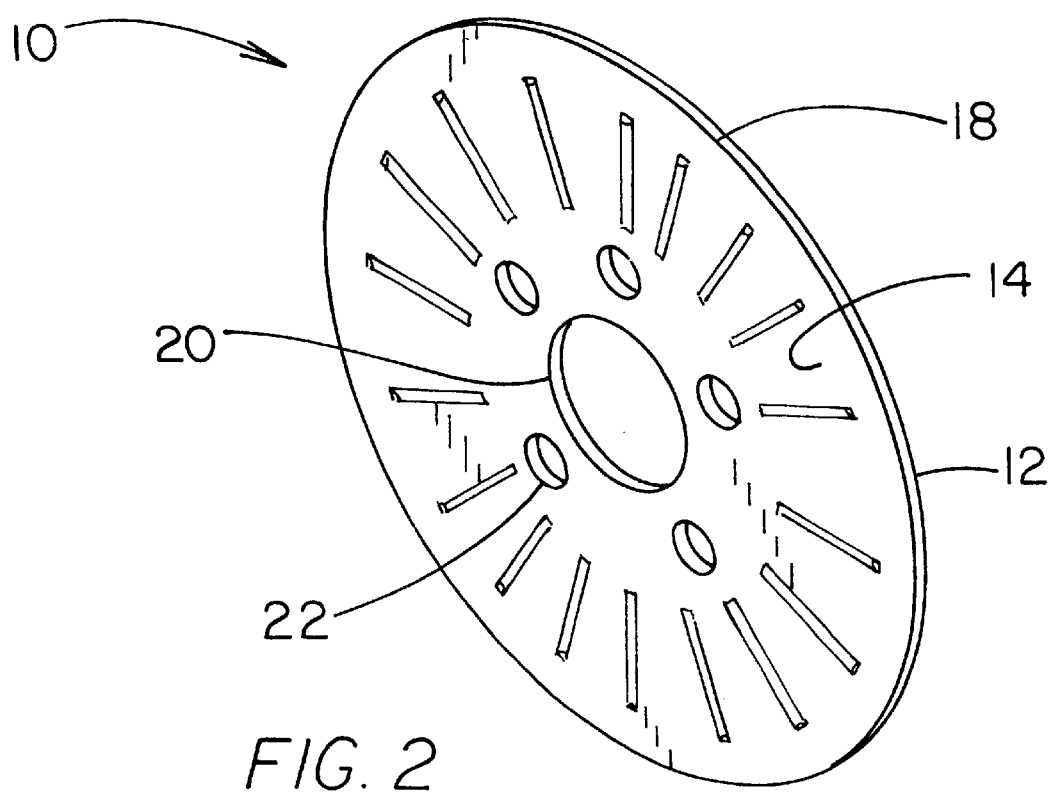
FIG. 2 is a schematic front perspective view of the present invention.
Figure 3:
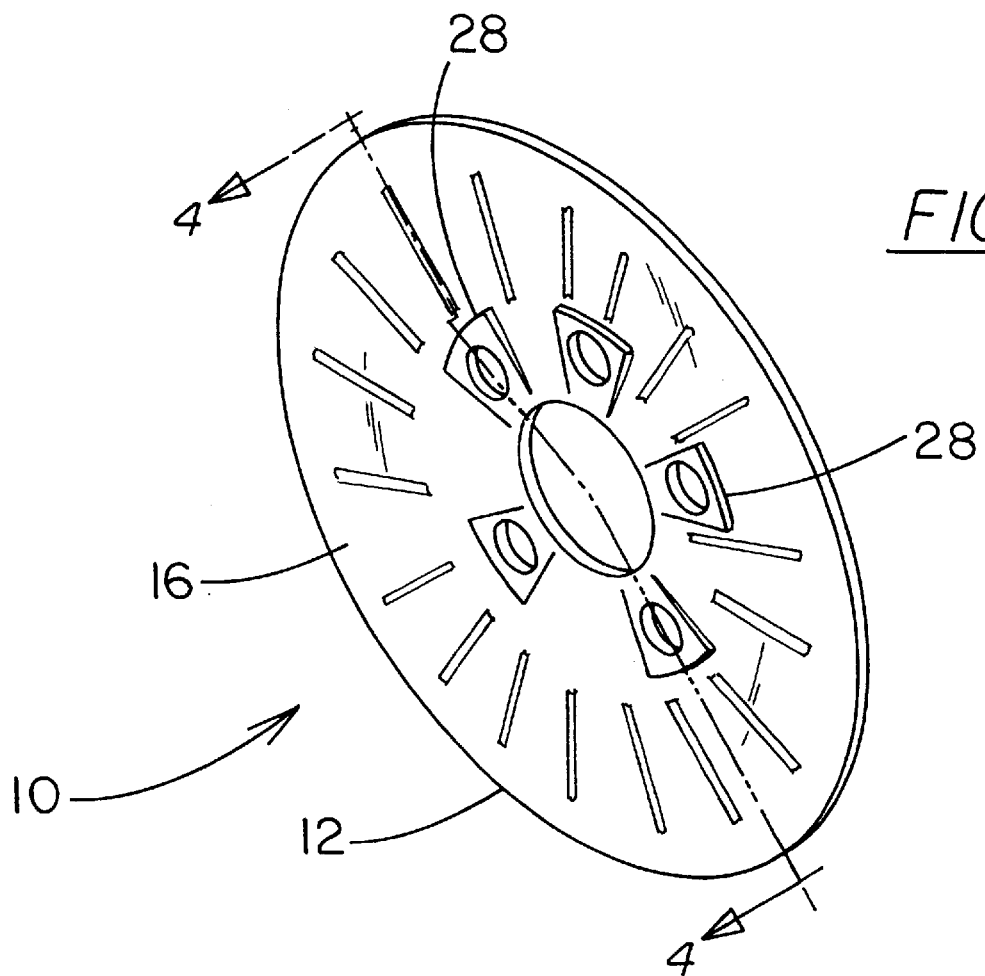
FIG. 3 is a schematic back perspective view of the present invention.
Figure 4:
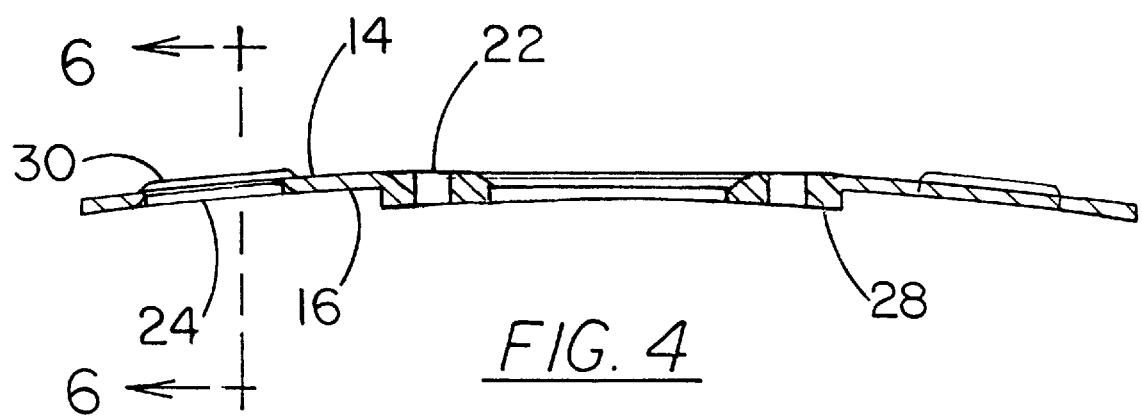
FIG. 4 is a schematic cross-sectional side view taken along line 4—4 of the present invention.

With reference now to the drawings, and in particular to FIGS. 1 through 6 thereof, a new dust cover for placement between a wheel and brake assembly embodying the principles and concepts of the present invention and generally designated by the reference numeral 10 will be described.

As best illustrated in FIGS. 1 through 6, the dust cover for placement between a wheel and brake assembly 10 generally comprises a device that is removably positionable on a hub 5 and a plurality of lug studs 6 on the hub of a vehicle axle between a wheel rim 7 and a disc brake assembly 8. The device 10 comprises a plate 12 having a front side 14, a back side 16 and a peripheral edge 18. The front 14 and back 16 sides generally have a circular shape. The plate 12 has an aperture 20 therethrough. The aperture 20 is generally positioned in a central portion of the plate 12 and has a size adapted for receiving the hub 5. The plate 12 has a plurality of openings 22 therein. Each of the openings 22 is positioned to receive one of the lug studs 6. The plate 12 has a plurality of elongate slots 24 therein. Each of the slots 24 radially extends toward the peripheral edge 18. Each of the slots 24 preferably has a pair of elongate side walls 26 that are generally parallel with each other and in an angular relationship with respect to a plane of the front side 14 of the plate 12. The angle formed by the side walls 26 and the front side 14 is generally between 90 degrees and 135 degrees. The plate 12 comprises a substantially rigid material. The substantially rigid material preferably comprises a metal though plastic may be used. The front side 14 of the plate 12 is ideally colored. The color can be matched to the body of the vehicle. Preferably, the front side 14 of the plate 12 is convex, and the back side 16 of the plate is concave.

Each of a plurality of raised portions 28 is integrally coupled to the back side. Each of the raised portions 28 is positioned around one of the openings 22.

Preferably, a plurality of air directing means direct air into the slots. Each of the air directing means comprises a wall 30 integrally coupled to the top surface 14 of the plate 12. Each of the walls 30 is positioned adjacent to and extending along an edge of one of the slots 24 such that one of the slots 24 is positioned between each of the walls 30. Each of the walls 30 preferably arcs over a respectively adjacent slot 24.

In use, the plate 12 is placed on the lug studs 6 before the wheel. Once in place, the wheel is placed on the hub 5 and lug studs 6. The slots 24 direct air toward the disc brakes 8 to keep the brake dust away from the wheel rim 7.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dust cover device, said device being removably positionable on a hub and a plurality of lug studs on the hub of a vehicle axle between a wheel rim and a disc brake assembly, said device comprising:

a plate, said plate having a front side, a back side and a peripheral edge, said front and back sides generally having a circular shape, said plate having an aperture therethrough, said aperture being generally positioned in a central portion of said plate and having a size adapted for receiving said hub, said plate having a plurality of openings therein, each of said openings being positioned to receive one of said lug studs, said plate having a plurality of elongate slots therein, each of said slots radially extending toward said peripheral edge, each of said slots having a pair of elongate side walls, each of said side walls being generally parallel with each other and in an angular relationship with respect to a plane of said front side of said plate, said plate comprising a substantially rigid material.

2. The dust cover device as in claim 1, wherein said plate comprises a metal.

3. The dust cover device as in claim 1, wherein said plate comprises a plastic.

4. The dust cover device as in claim 1, wherein said front side of said plate is convex, said back side of said plate being concave, further comprising a plurality of raised portions, each of said raised portions being integrally coupled to said back side, each of said raised portions being positioned around one of said openings.

5. The dust cover device as in claim 1, further comprising a plurality of air directing means for directing air into said slots, each of said air directing means comprising a wall, each of said walls being integrally coupled to said top surface of said plate, each of said walls being positioned adjacent to and extending along an edge of one of said slots such that one of the slots is positioned between each of said walls.

6. A dust cover device, said device being removably positionable on a hub and a plurality of lug studs on the hub of a vehicle axle between a wheel rim and a disc brake assembly, said device comprising:

a plate having a front side, a back side and a peripheral edge, said front and back sides generally having a circular shape, said plate having an aperture therethrough, said aperture being generally positioned in a central portion of said plate and having a size adapted for receiving said hub, said plate having a plurality of openings therein, each of said openings being positioned to receive one of said lug studs, said plate having a plurality of elongate slots therein, each of said slots radially extending toward said peripheral edge, each of said slots having a pair of elongate side walls, each of said side walls being generally parallel with each other and in an angular relationship with respect to a plane of said front side of said plate, said angle formed by said side walls and said front side being generally between 90 degrees and 135 degrees, said plate comprising a substantially rigid material, said substantially rigid material comprising a metal, said front side of said plate being colored, said front side of said plate being convex, said back side of said plate being concave;

a plurality of raised portions, each of said raised portions being integrally coupled to said back side, each of said raised portions being positioned around one of said openings; and a plurality of air directing means for directing air into said slots, each of said air directing means comprising a wall, each of said walls being integrally coupled to said top surface of said plate, each of said walls being positioned adjacent to and extending along an edge of one of said slots such that one of the slots is positioned between each of said walls, each of said walls arcing over a respectively adjacent slot.

7. A dust cover device, said device being removably positionable on a hub and a plurality of lug studs on the hub of a vehicle axle between a wheel rim and a disc brake assembly, said device comprising:

a plate having a front side, a back side and a peripheral edge, said front and back sides generally having a circular shape, said plate having an aperture therethrough, said aperture being generally positioned in a central portion of said plate and having a size adapted for receiving said hub, said plate having a plurality of openings therein, each of said openings being positioned to receive one of said lug studs, said plate having a plurality of elongate slots therein, each of said slots radially extending toward said peripheral edge, said plate comprising a substantially rigid material; and a plurality of air directing means for directing air into said slots, each of said air directing means comprising a wall, each of said walls being integrally coupled to said top surface of said plate, each of said walls being positioned adjacent to and extending along an edge of one of said slots such that one of the slots is positioned between each of said walls.

8. The dust cover device as in claim 7, wherein each of said slots having a pair of elongate side walls, each of said side walls being generally parallel with each other.

9. The dust cover device as in claim 7, wherein said plate comprises a metal.

10. The dust cover device as in claim 7, wherein said plate comprises a plastic.

11. The dust cover device as in claim 7, wherein said front side of said plate is convex and said back side of said plate is concave, further including a plurality of raised portions, each of said raised portions being integrally coupled to said back side, each of said raised portions being positioned around one of said openings.

* * * * *